United States Patent [19]

Yoshino

[11] Patent Number: 5,896,205
[45] Date of Patent: Apr. 20, 1999

[54] IMAGE RECEIVING APPARATUS FOR ADDING ID RECEPTION INFORMATION

[75] Inventor: Motoaki Yoshino, Kawasaki, Japan

[73] Assignee: Canon Kabushiki Kaisha, Tokyo, Japan

[21] Appl. No.: 08/215,397

[22] Filed: Mar. 21, 1994

Related U.S. Application Data

[63] Continuation of application No. 07/821,139, Jan. 16, 1992, abandoned, which is a continuation of application No. 07/537,784, Jun. 14, 1990, abandoned.

[30] Foreign Application Priority Data

Jun. 14, 1989 [JP] Japan .................. 1-149574

[51] Int. Cl.⁶ .................................................. H04N 1/32
[52] U.S. Cl. .......................... 358/439; 358/440; 358/468
[58] Field of Search ............................ 358/434, 439, 358/440, 468; 395/114; H04N 1/32

[56] References Cited

U.S. PATENT DOCUMENTS

| | | | |
|---|---|---|---|
| 4,126,585 | 11/1978 | Kurogane et al. | 358/450 |
| 4,631,597 | 12/1986 | Ogawa | 358/440 |
| 4,703,329 | 10/1987 | Allen et al. | 358/304 |
| 4,772,955 | 9/1988 | Kurahayashi et al. | 358/257 |
| 4,811,111 | 3/1989 | Kurokawa | 358/440 |
| 4,843,479 | 6/1989 | Yoshino et al. | 358/257 |
| 4,849,816 | 7/1989 | Yoshida | 358/434 |
| 4,862,254 | 8/1989 | Takada | 358/75 |
| 4,870,503 | 9/1989 | Miura | 358/256 |
| 5,072,306 | 12/1991 | Matsumoto et al. | 358/449 |
| 5,075,783 | 12/1991 | Yoshida et al. | 358/439 |
| 5,128,762 | 7/1992 | Muramatsu et al. | 358/296 |
| 5,140,430 | 8/1992 | Horii et al. | 358/449 |
| 5,296,933 | 3/1994 | Nakatsuji | 358/400 |

FOREIGN PATENT DOCUMENTS

| | | |
|---|---|---|
| 58-93068 | 6/1983 | Japan . |
| 60-180369 | 9/1985 | Japan . |
| 63-191458 | 8/1988 | Japan . |
| 64-24560 | 1/1989 | Japan . |

OTHER PUBLICATIONS

IBM Technical Disclosure Bulletin vol. 24 No. 12 1982 S. Meguro 358-434 pp. 6498-6500.

Primary Examiner—Kim Yen Vu
Attorney, Agent, or Firm—Fitzpatrick Cella Harper & Scinto

[57] ABSTRACT

There is provided an image receiving apparatus such as a facsimile apparatus which can record and output the received image data on a page unit basis. The apparatus comprises: a receiving unit to receive image data; a recorder to record the received image data; a generator to generate reception ID information including a reception number and a page number; and a controller for allowing the reception ID information to be added and recorded to the received image data every page. The recording mode is manually or automatically set into either a mode to cut and output the received image on a page unit basis or a mode to cut and output the received image on a communication unit basis.

26 Claims, 4 Drawing Sheets

IMAGE RECEIVING APPARATUS FOR ADDING ID RECEPTION INFORMATION

This application is a continuation of application Ser. No. 07/821,139 filed Jan. 16, 1992, now abandoned, which is a continuation of Ser. No. 07/537,784 filed Jun. 14, 1990, now abandoned.

BACKGROUND OF THE INVENTION

1. Field of the Invention

The present invention relates to an image receiving apparatus, and more particularly to an image receiving apparatus in which the received image data can be recorded and output in units of page.

2. Related Background Art

Hitherto, in this type of apparatus such as a facsimile apparatus, there has been known an apparatus in which in order to discriminate a receiving paper on the reception side, transmission side information such as transmission side name, telephone number, page number, and the like are added to an image on the transmission side and, thereafter, the image is transmitted and, on the reception side, the transmission side information is recorded as header information. As related background arts regarding such an apparatus, there have been proposed U.S. Pat. application Ser. No. 945,895 filed on Dec. 24, 1986, U.S. Pat. No. 4,843,479 and U.S. Pat. No. 4,849,816.

From the reception side, although a problem hardly occurs in the case where a transmitting apparatus having the ID information transmitting function as mentioned above is a partner station, an apparatus which doesn't have the ID information transmitting function is also used. There is a problem such that if a large quantity of image data is received from such an apparatus or if image data is received many times from such an apparatus, it is difficult to sort the reception cut sheets and a large amount of labors and a long time are needed.

SUMMARY OF THE INVENTION

It is an object of the present invention to improve an image receiving apparatus in consideration of the above problems.

Another object of the invention is to provide an image receiving apparatus in which reception recording outputs can be easily sorted irrespective of the kind of apparatuses on the transmission side.

Still another object of the invention is to provide an image receiving apparatus in which, in the case of recording and outputting the received image data in units of page, reception ID information is added to each page of the received image and the image data is recorded.

Another object of the invention is to provide an image receiving apparatus which has a plurality of reception recording modes and adds reception ID information to each page of the received image in accordance with the reception recording mode.

The above and other objects and features of the present invention will become apparent from the following detailed description and the appended claims with reference to the accompanying drawings.

DETAILED DESCRIPTION OF THE PREFERRED EMBODIMENT

An embodiment of the present invention will be described in detail hereinbelow with reference to the drawings.

Figure 1:
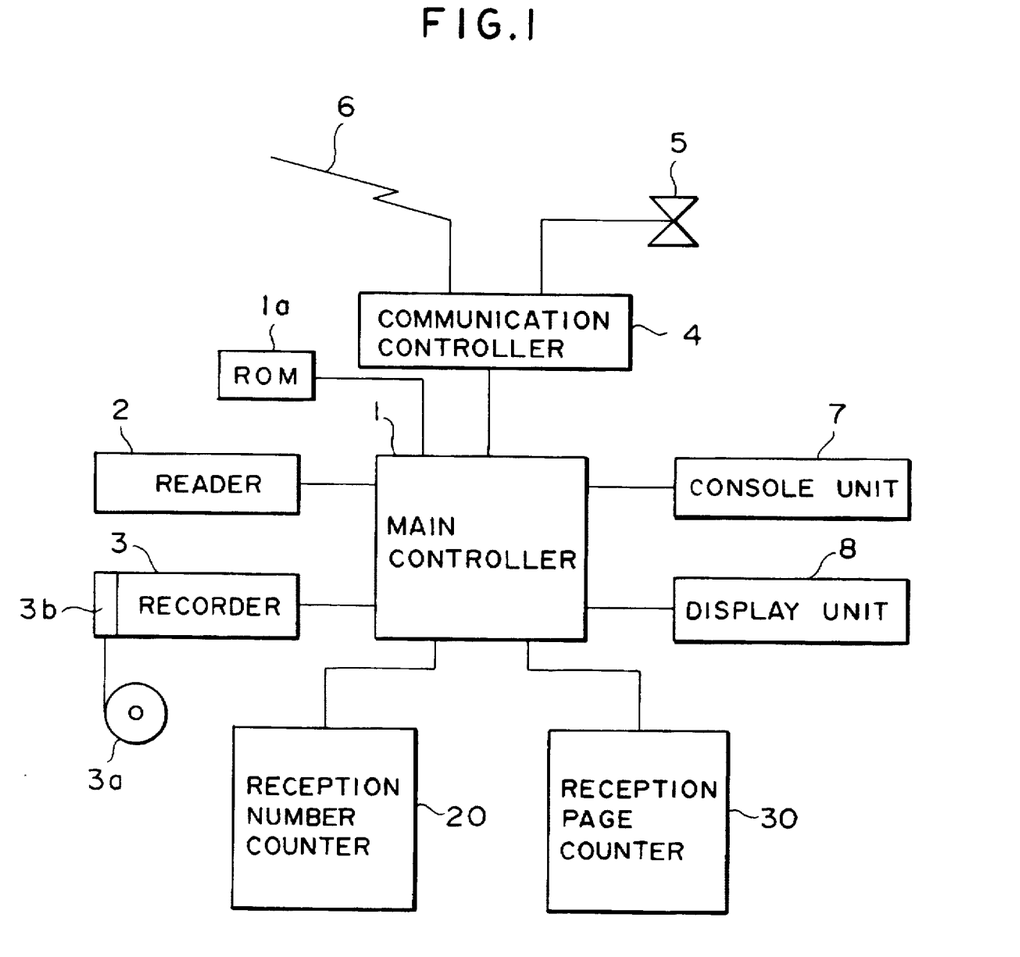
FIG. 1 is a block diagram showing a construction of a facsimile apparatus of an embodiment.

FIG. 1 shows a structure of a facsimile apparatus to which the invention is applied.

In FIG. 1, reference numeral 1 denotes a main controller comprising a microprocessor and the like. Each section of the apparatus as shown below is connected to a system bus comprising an address bus, a data bus, and the like of the main controller 1. The main controller 1 controls the whole apparatus in accordance with programs stored in an ROM 1a.

First, the reader 2 is constructed of a CCD line sensor, an original conveying system, and the like and is used to read an image of the original.

A recorder 3 is constructed by a thermal printer and the like and is used to record the received image or to record the image which was read by the reader 2 when the original is copied.

It is assumed that the recorder 3 uses a roll-shaped recording paper 3a and has a recording paper cutter 3b which can cut the front edge portion of the recorded recording paper 3a in accordance with the control of the main controller 1. It is also possible to inhibit the cutting operation of the recording paper by the cutter 3b, as will be explained hereinlater.

The recorder 3 has therein a character generator ROM and the like and can print the characters corresponding to the character codes or the like which were input from the main controller 1.

A communication controller 4 comprises a modem, an NCU, a call signal detector and the like, and executes the inputting and outputting operations of a procedure signal and an image signal between the communication controller 4 and a line 6 such as a telephone line or the like. A telephone set 5 for manual line control or speech communication is connected to the communication controller 4.

A console unit 7 comprises an LCD display and a keyboard having ten-keys function keys, and the like. A display unit 8 comprises an LCD display and the like and is used to display the present time, an operating state, and the like.

Although the above construction is similar to that in the well-known facsimile apparatus, counters indicated at reference numerals 20 and 30 are provided in the present embodiment.

In the embodiment, a peculiar reception number is assigned every reception. Each time the receiving operation is executed, the reception number counter 20 is counted up by "1" by the main controller 1, thereby deciding the reception number. For instance, the counter 20 can count four digits by the decimal number, that is, from 0000 to 9999.

The reception page counter 30 is used to count the number of pages of the images which were received by one receiving operation. The main controller 1 resets the counter 30 at the first timing of the reception and, thereafter, increases the count value of the counter 30 by "1" each time the image of one page is received. The reception page counter 30 can count the page number of, for instance, from 000 to 999.

Each of the counters 20 and 30 is constructed so as to be reset to "0" if the counter is further counted up after the count value reaches the maximum value (9999 or 999).

The count information by the counters 20 and 30 is recorded and output on the recording paper 3a as a reception ID (identification) code to discriminate the receiving operation or reception page as will be explained hereinlater.

The cutting control of the recording paper 3a upon reception in the above construction will now be described with reference to a flowchart of FIG. 2. It is now assumed that a procedure of FIG. 2 has already been stored in the ROM 1a as a control program of the CPU 1.

Figure 2:
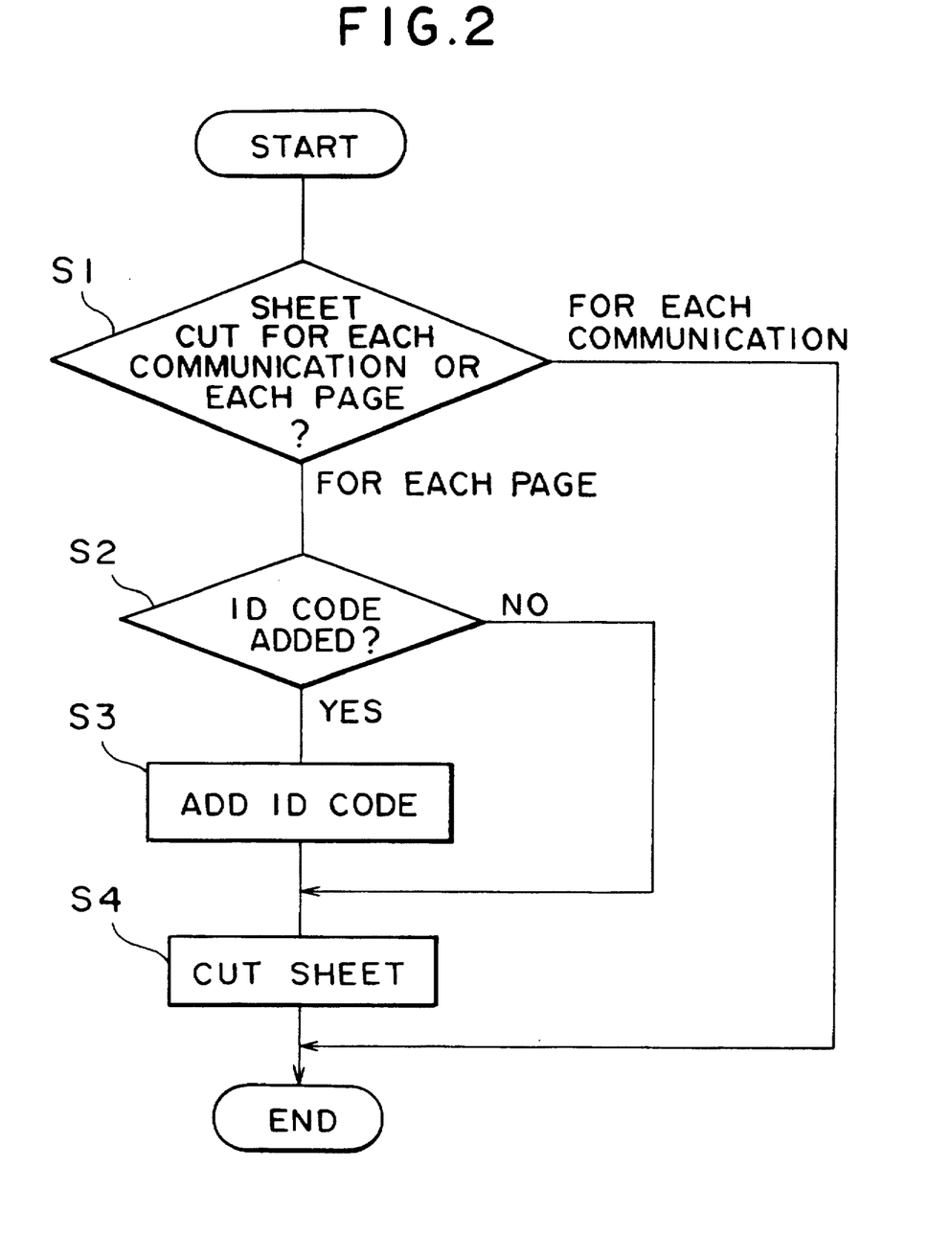
FIG. 2 is a flowchart showing a sheet cutting control of a recording paper by a main controller 1 of the embodiment.

In the automatic signal reception based on the detection of a call signal by the communication controller 4 or the manual signal reception through the incoming call control of the telephone 5, the procedure of FIG. 2 is executed just after the image data of one page was recorded onto the recording paper 3a by the recorder 3. The pre-procedure and the reception and recording of the image of one page are executed under substantially the same control as that in the conventional apparatus.

After the image of one page was recorded by the recorder 3, the main controller 1 discriminates whether the recording paper in the recorder 3 is cut for every communication or every page. The above two recording paper cutting modes can be set and changed by a switching operation of the console unit 7 or the like. In the case of cutting every communication, the cutting control is finished and the processing routine advances to the receiving and recording step of the next page.

In the mode for cutting the recording paper every page, a check is made in step S2 to see if the reception ID code is recorded or not. In the case of the embodiment, the reception ID code relates to the reception number and reception page number which were counted by the counters 20 and 30. Whether the reception ID code is recorded or not is determined by the entry from the console unit 7.

Only when it is determined in step S2 that the reception ID code is recorded, is the DO code recorded in step S3.

As before mentioned, each time the signal is received, the reception number counter 20 counts the reception number which is peculiar to the communication and the reception page counter 30 is reset to "0" on every communication and is counted up each time the image of one page is recorded during the communication.

In view of this, in step S3, since the communication number peculiar to the signal receiving process has already been stored in the reception number counter 20 and the page number which was recorded just previously has already been stored in the reception page counter 30, the communication number and page number information are input to the recorder 3 and converted into the dot matrix data by using the character generator or the like in the recorder 3 and recorded onto the recording paper 3a.

After completion of step S2 or S3, the recording paper 3a is cut to a predetermined size by the cutter 3b in step S4. Then, the processing routine advances to the process to receive the next page.

Figure 3:
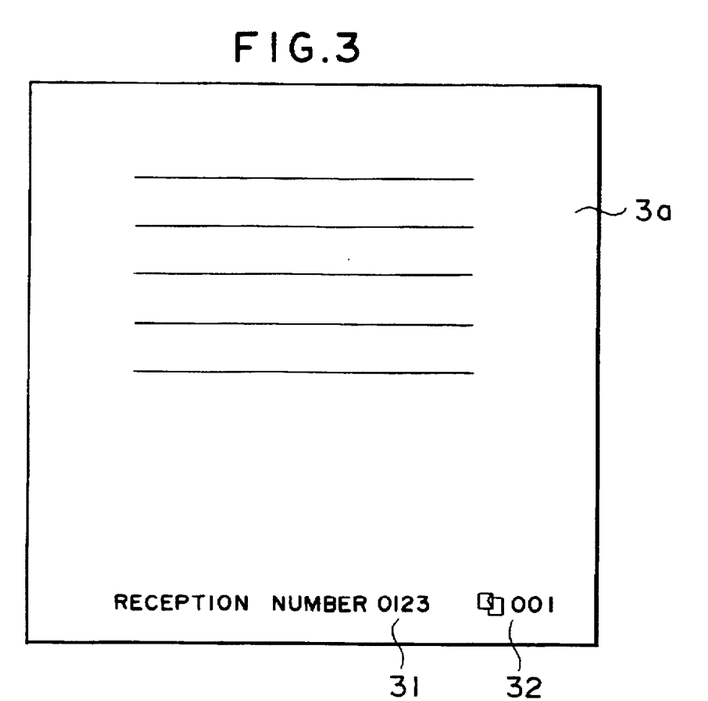
FIGS. 3 and 4 are diagrams showing an example of the recording and output by the apparatus of the embodiment.
Figure 4:
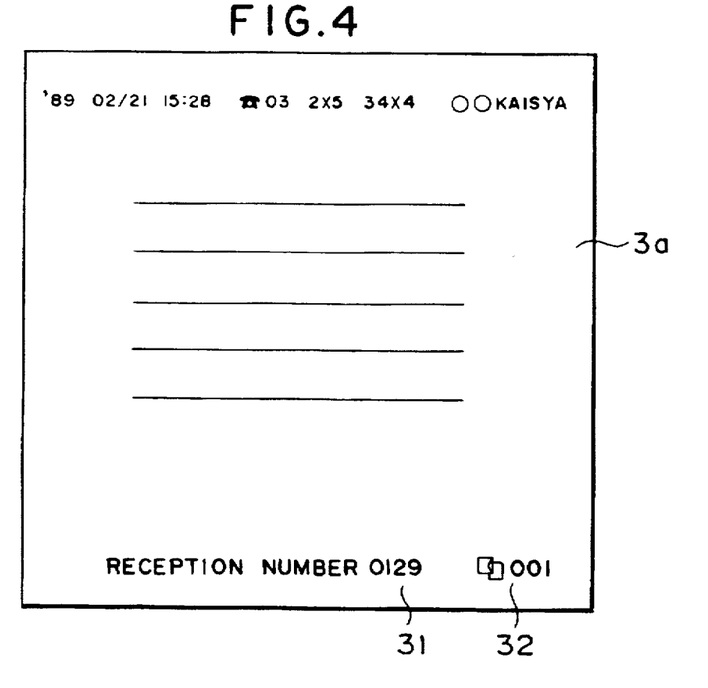

In the case where the processes in steps S1 to S4 were executed as, the recording and output are executed shown in FIGS. 3 and 4.

In FIG. 3, a reception number 31 counted by the reception number counter 20 and a page number 32 counted by the reception page counter 30 are recorded on the right side of the final edge portion of the recording paper 3a.

In FIG. 3, the transmission side does not transmit any ID information and only the reception number 31 and the page number 32 are recorded. In the case of FIG. 4, the ID information is transmitted from the transmission side by the method which has already been described in the item of the related background art and ID information 33 such as abbreviation of the transmitting station, telephone number, communication date and time and the like is recorded at the head of the recording paper 3a. The ID information 33 is recorded as header information. Therefore, the reception number 31 and the page number 32 which are recorded by the above control are recorded without overlapping.

According to the above embodiment, as will be obviously understood from FIG. 3, even in the case where the ID information is not transmitted from the transmitting station, the reception ID information, that is, the reception number 31 and the page number 32 are recorded. Therefore, even if the image data was received with a large number of pages or a plurality of communications from a station which does not transmit any ID information, the recorded reception cut sheets can be easily sorted in a short time.

On the other hand, according to the above control, it is also possible to select a mode to output the recording paper corresponding to the image data of one communication without cutting the paper. In such a case, since the continuous recording paper is output every communication, the sorting work becomes easier.

Figure 5:
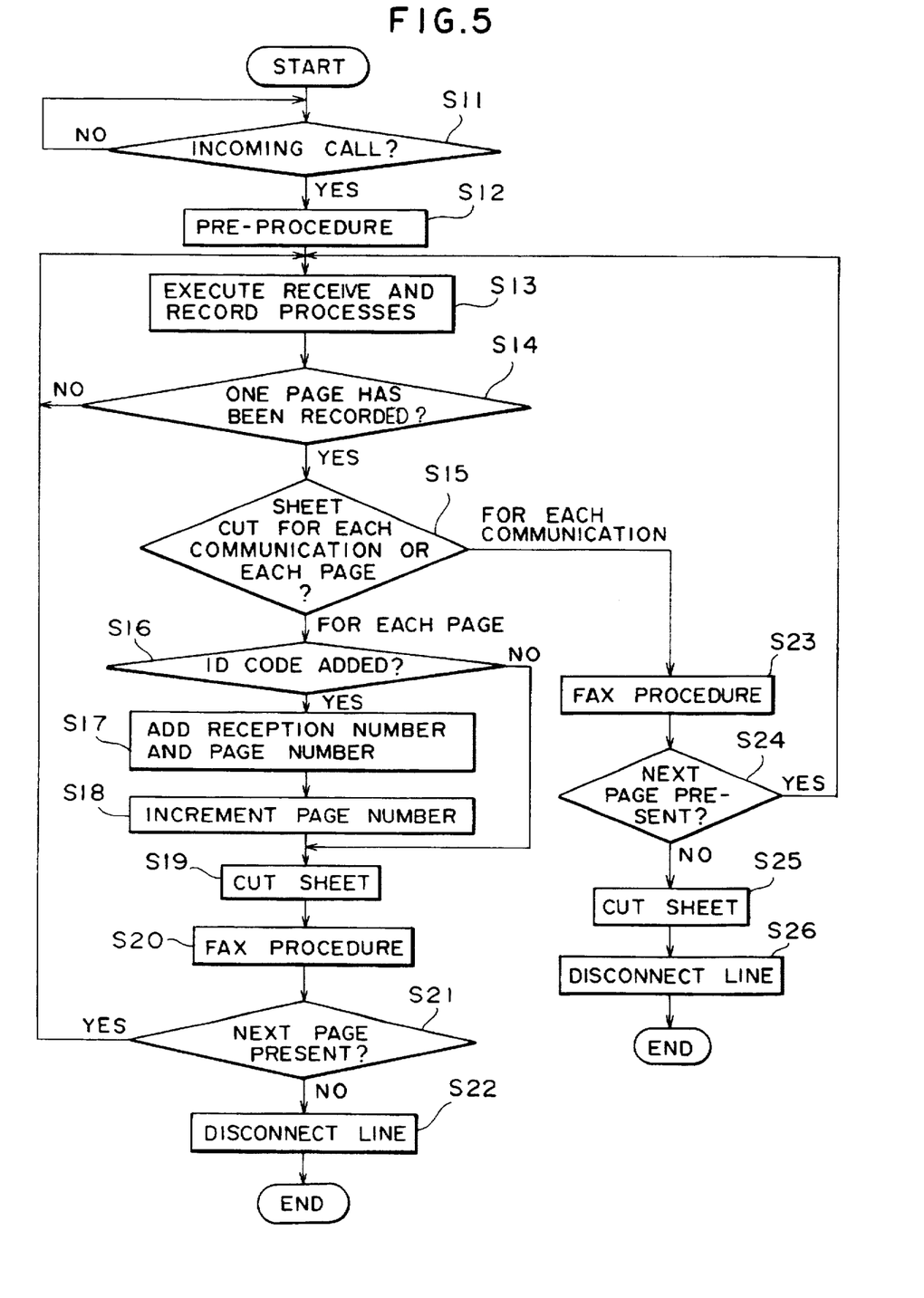
FIG. 5 is a flowchart showing the detailed control operation of the main controller 1 of the embodiment.

FIG. 5. is a flowchart showing the detailed control operation of the main controller 1 in the embodiment for explaining the receiving and recording processes of the image data which were omitted in the flowchart of FIG. 2.

In step S11, when a call signal (for instance, a call signal of 16 Hz) from line 6 is detected through the communication controller 4, it is determined that an incoming call has been received, so that the processing routine advances to step S12. In step S12, a facsimile communication procedure (pre-procedure) is executed, the receiving mode of the image data is decided, and the operating mode is set to the receiving mode determined. After completion of the setting of the receiving mode, the image data is received in step S13 and the decoding process of the received image data and the recording process in steps S13 and S14 are repeated until the completion of the reception and recording of the image data of one page. After the reception and recording of the image data of one page are finished, a check is made in step S15 to see if the cutting mode of the apparatus has been set into the cutting mode for each page or for each communication in a manner similar to step S1 in FIG. 2. If it is determined in step S15 that the cutting mode for each page has been set, a check is then made in step S16 to see if the apparatus has been set into the mode to add the reception ID infomation such as reception number, page number, and the like or not. If it is decided in step S16 that the reception ID information adding mode has been set, steps S17 and S18 follow and the reception ID information such as reception number, page number, and the like is added to the received image data and recorded, then the count value of the page number is increased by "1". After the addition and recording of the reception ID information were finished as mentioned above, in step S19, the recording paper on which the image was recorded is cut and ejected out. In step S20, the facsimile communication procedure is executed. After that, a check is made in step S21 to see if the reception and recording of all of the pages have been finished or not. If the next page still exists in step S21, the processing routine is returned to step S13. After completion of the reception and recording of all of the pages, line 6 is disconnected in step S22 and the process of reception of the image data is finished. If it is determined in step S16 that the reception ID information adding mode is not set, the processing routine soon advances from step S16 to step S19.

If the received image data is recorded and output in units of page and the apparatus has been set into the reception ID information adding mode by the above processes, the reception ID information is added to each page and recorded.

On the other hand, if it is decided in step S15 that the cutting mode for each communication has been set, the facsimile communication procedure is executed in step S23. A check is made in step S24 to see if the reception of all of the pages has been finished or not. If the image reception of all of the pages has been finished and the processes of one reception are finished the recording paper on which the image was recorded is cut in step S25 and line 6 is disconnected in step S26 and the receiving process is finished.

Although a discrimination regarding whether the reception ID information is recorded or not is determined by the manual setting of the console unit 7 in the above embodiment, such a setting can also be automatically executed in accordance with the content of a predetermined procedure signal which is communicated between the transmitting station and the receiving apparatus.

Although the case where a paper is used as a recording output medium (recording paper) has been shown and described above as an example, the similar control can be also executed in the case of using other material.

On the other hand, although the embodiment has been described as an example with respect to the case of the reception ID information comprising the reception number and page number, the reception date and time which were counted by a timer or the like and the name, telephone number, and the like of the partner station which were obtained from a procedure signal of the partner station can also be recorded as reception ID information.

Further, although the apparatus in which the recorder has the recording paper cutter has been shown and described above as an example, the similar control can be also performed even in an apparatus such as a laser beam printer using cut sheets or the like. In this case, it is sufficient that the processes, except steps S1 and S4 in FIG. 2, are executed after completion of the recording of one page.

On the other hand, a similar technique can be obviously embodied in an apparatus in which the reception image data is once stored into an image memory or the like, and after the line was disconnected, the image data is recorded by the recorder.

The present invention is not limited to the foregoing embodiments but many modifications and variations are possible within the spirit and scope of the appended claims of the invention.

What is claimed is:

1. An image receiving apparatus comprising:

receiving means for receiving image data;

recording means for recording the received image data onto a sheet, said recording means having a first recording mode for recording each page of the received image data onto separate sheets and a second recording mode for recording each page of the received image data onto one sheet;

generating means for generating respective additional information for each reception at a reception side, the respective additional information being different from additional information generated in a previous reception; and control means adapted to add the same additional information to each page of the received image data of one reception when said recording means is set into the first recording mode.

2. An apparatus according to claim 1, wherein when said recording means is set into the second recording mode, said control means does not add the additional information to the received image.

3. An apparatus according to claim 1, wherein the sheet is a long recording paper, and said recording means cuts the long recording paper for each page of the received image data in the first recording mode, and cuts the long recording paper for each communication in the second recording mode.

4. An apparatus according to claim 1, wherein the additional information generating means generates information including a reception number.

5. An apparatus according to claim 1, wherein said control means adds the additional information onto a bottom portion of each page of the received image data.

6. An apparatus according to claim 1, wherein said control means adds the additional information to an area of said sheet different from where ID information added at a transmission side, included in the received image data, is received.

7. An image receiving apparatus having a first cut mode for recording received image data onto a rolled paper and for cutting the image recorded rolled paper in divisions of single pages, and a second cut mode for recording received image data onto the rolled paper and for cutting the image recorded rolled paper in divisions of each reception, comprising:

generating means for generating respective additional information for each reception at a reception side, the respective additional information being different from additional information generated in a previous reception; and selection means for selecting the first cut mode or the second cut mode; and control means adapted to add the additional information to each page of the received image data and to record the received image data with the additional information in accordance with the cut mode selected by said selection means.

8. An apparatus according to claim 7, wherein said additional information generating means comprises:

first counting means for updating a count value for each reception; and second counting means for counting the number of pages of the image data in one reception, and the additional information is a page number and is produced on the basis of count values of said first counting means and said second counts means.

9. An apparatus according to claim 7, wherein said control means allows the additional information to be added and recorded in the first cut mode.

10. An apparatus according to claim 7, wherein said control means adds the additional information onto a bottom portion of each page of the received image data.

11. An apparatus according to claim 7, wherein said control means adds the additional information to an area of said page different from where ID information added at a transmission side, included in the received image data, is received.

12. An image receiving method, for an image receiving apparatus, comprising the steps of:
   receiving image data;
   recording the received image data onto a sheet, the recording step having a first recording mode for recording each page of the received image data onto separate sheets and a second recording mode for recording each page of the received image data onto one sheet;
   generating respective additional information for each reception at a reception side, the respective additional information being different from additional information generated in a previous reception; and
   controlling the apparatus to add the same additional information to each page of the received image data of one reception when the recording step is set to the first recording mode.

13. A method according to claim 12, wherein when the recording step is set to the second recording mode, the controlling step does not add the additional information to the received image.

14. A method according to claim 12, wherein the sheet is a long recording paper, and the recording step cuts the long recording paper for each page of the received image data in the first recording mode, and cuts the long recording paper for each communication in the second recording mode.

15. A method according to claim 12, wherein the additional information generating step generates information including a reception number.

16. A method according to claim 12, wherein the controlling step adds the additional information onto a bottom portion of each page of the received image data.

17. A method according to claim 12, wherein the apparatus is also controlled to add the additional information to an area of the sheet different from where ID information added at a transmission side, included in the received image data, is recorded.

18. An image receiving method, for an image receiving apparatus, having a first cut mode for recording received image data onto a rolled paper and for cutting the image recorded rolled paper in divisions of single pages, and a second cut mode for recording received image data onto the rolled paper and for cutting the image recorded rolled paper in units of reception, comprising the steps of:
   generating respective additional information for each reception at a reception side, the respective additional information being different from additional information generated in a previous reception;
   selecting the first cut mode or the second cut mode; and
   controlling the image receiving apparatus to add the additional information to each page of the received image data and to record the received image data with the additional information in accordance with the cut mode selected in the selecting step.

19. A method according to claim 18, wherein said additional information generating step comprises the steps of:
   a first counting step for updating a count value for each reception; and
   a second counting step for counting the number of pages of the image data regarding one reception,
   wherein the additional information of a reception number and a page number are produced on the basis of count values of the first counting step and the second counting step.

20. A method according to claim 18, wherein the controlling step allows the additional information to be added and recorded in the first cut mode.

21. A method according to claim 18, wherein the controlling step adds the additional information onto a bottom portion of each page of the received image data.

22. A method according to claim 18, wherein the apparatus is also controlled to add the additional information to an area of the page different from where ID information added at a transmission side, included in the received image data, is recorded.

23. An image receiving apparatus comprising:
   receiving means for receiving image data of a plurality of pages in one reception;
   recording means for recording the received image data on a plurality of sheets;
   generating means for generating at least one numeral for each reception at a reception side, the numeral being different from a numeral generated in a previous reception; and
   control means adapted to add the same numeral generated by said generating means to each page of received image data received by said receiving means in one reception, and to record the received image data with the numeral by said recording means, wherein said control means adds the numeral to an area of said sheet different from where ID information added at a transmission side, included in the received image data, is recorded.

24. An image receiving method, for an image receiving apparatus, comprising the steps of:
   receiving image data of a plurality of pages in one reception;
   recording the received image data on a plurality of sheets;
   generating at least one numeral for each reception at a reception side, the numeral being different from a numeral generated in a previous reception; and
   controlling the apparatus to add the same numeral generated in said generating step to each page of received image data received in said receiving step in one reception, and to record the received image data with the numeral in said recording step, wherein the apparatus is also controlled to add the numeral to an area of the sheet different from where ID information added at a transmission side, included in the received image data, is recorded.

25. An image receiving apparatus comprising:
   receiving means for receiving image data of a plurality of pages in one reception;
   recording means for recording the received image data on a plurality of sheets;
   generating means for generating at least one character for each reception at a reception side, the character being different from a character generated in a previous reception; and
   control means adapted to add the same character generated by said generating means to each page of received image data received by said receiving means in one reception, and to record the received image data with the character by said recording means, wherein said control means adds the character to an area of said sheet different from where ID information added at a transmission side, included in the received image data, is recorded.

26. An image receiving apparatus comprising:

receiving image data of a plurality of pages in one reception;

recording the received image data on a plurality of sheets;

generating at least one character for each reception at a reception side, the character being different from a character generated in a previous reception; and controlling the apparatus to add the same character generated by said generating means to each page of received image data received in said receiving step in one reception, and to record the received image data with the character in said recording step, wherein the apparatus is also controlled to add the character to an area of the sheet different from where ID information added at a transmission side, included in the received image data, is recorded.

* * * * *

UNITED STATES PATENT AND TRADEMARK OFFICE
CERTIFICATE OF CORRECTION

PATENT NO. : 5,896,205
DATED : April 20, 1999
INVENTOR(S) : MOTOAKI YOSHINO

It is certified that error appears in the above-identified patent and that said Letters Patent is hereby corrected as shown below:

ON COVER PAGE AT [56], Attorney, Agent or Firm

"Fitzpatrick Cella Harper & Scinto" should read --Fitzpatrick, Cella, Harper & Scinto--.

COLUMN 1

Line 37, "labors" should read --labor--.

COLUMN 3

Line 44, "DO" should read --ID--.
Line 66, "executed as," should read --executed,--.
Line 66, "shown" should read --shown as--.

COLUMN 6

Line 59, "counts" should read --counting--.

UNITED STATES PATENT AND TRADEMARK OFFICE
CERTIFICATE OF CORRECTION

PATENT NO. : 5,896,205
DATED     : April 20, 1999
INVENTOR(S): MOTOAKI YOSHINO

It is certified that error appears in the above-identified patent and that said Letters Patent is hereby corrected as shown below:

COLUMN 9

Line 1, "apparatus comprising:" should read --method comprising the steps of:--.

Signed and Sealed this

Ninth Day of November, 1999

Attest:

Q. TODD DICKINSON

Attesting Officer

Acting Commissioner of Patents and Trademarks